UNITED STATES PATENT OFFICE.

JANE SANDERSON, OF NEW YORK, N. Y.

PLASTIC COMPOSITION.

1,287,453.　　　　Specification of Letters Patent.　　Patented Dec. 10, 1918.

No Drawing.　　Application filed January 21, 1918.　Serial No. 212,887.

*To all whom it may concern:*

Be it known, that I, JANE SANDERSON, a citizen of the United States, residing at the city of New York, borough of Manhattan, in the county and State of New York, have invented certain new and useful Improvements in Plastic Compositions, of which the following is a full, clear, and exact specification.

My invention relates to improvements in plastic compositions, and the same has for its object more particularly to provide a simple, efficient and easily workable composition which may be used in all classes of industrial, mechanical, artistic and surgical work.

Further, said invention has for its object to provide a composition of matter, which, when in its plastic state, may be easily worked or shaped for any purpose, and which will quickly set and become hard at ordinary atmospheric temperature.

Further, said invention has for its object to provide a composition which, at a temperature slightly above atmospheric, may be worked or shaped, and upon cooling down to the ordinary atmospheric temperature will readily set and become hard and rigid.

Further, said invention has for its object to provide a composition of matter which, at a temperature above 120 Fahrenheit, becomes plastic, and upon cooling down to ordinary atmospheric temperature will set and become hard and rigid, and which may again be rendered plastic by subjecting the same to a temperature of 120 Fahrenheit.

Further, said invention has for its object to provide a composition of matter which when mixed and raised to the required temperature is easily workable, and which, upon being subjected to ordinary atmospheric temperature, will harden, set and become rigid, and which may, upon being thereafter heated to 120 Fahrenheit, be repeatedly used and worked.

Other objects will in part be obvious and in part be more fully described hereinafter.

To the attainment of the aforesaid objects and ends my invention consists in the composition incorporating the ingredients hereinafter more fully described and then pointed out in the claims.

I have found that a satisfactory composition for the purpose hereinabove specified may be produced by combining the following ingredients or substances in about the proportions specified, viz:—plaster of Paris forty-one (41) parts, boiled linseed oil two (2) parts, a vegetable wax, preferably carnauba wax, three (3) parts, resin eleven (11) parts. Instead of a vegetable wax I may employ an animal wax, such as beeswax.

The above ingredients in the quantity specified are preferably combined by dissolving the resin in the boiled linseed oil, which should first be heated to such temperature as will cause the resin to melt, thereupon adding to the mixture the carnauba wax, and thereupon adding to the mixture of boiled linseed oil, resin and carnauba wax the plaster of Paris. The entire mixture is thereupon thoroughly mixed, during which time it is maintained at a temperature of not less than 120 Fahrenheit.

When the ingredients above specified have been thoroughly intermixed the composition is permitted to cool down to atmospheric temperature, whereupon the same will become hard and rigid.

To use the composition it merely becomes necessary to heat the same again to a temperature of 120 Fahrenheit, or to a temperature somewhat above 120, whereupon the entire mass will again become plastic and permit of the same being worked, molded or shaped as desired, depending upon the purposes for which the same is to be used.

As soon as the composition has been worked into the desired form it is merely necessary to permit the mixture to cool down to atmospheric temperature whereupon the same will become hard and fixed.

It is to be noted that my composition is readily adapted for all industrial, mechanical, artistic and surgical purposes wherein plaster of Paris or a similar substance is now employed as a mold or form, but that my composition possesses the additional advantage that the same may be repeatedly used without destroying or in any way impairing its efficiency.

In surgical work it merely becomes necessary to heat the mixture required and then spread the same upon or between suitable bandages when applying the same to the injured or broken member and permit the same to set in the same way that plaster of Paris is now used as a cast for such purposes. In connection with surgical work my composition possesses the unusual advantage of enabling the operator to shape or rework parts of the cast while in position upon the patient by merely applying heat to the particular part of the cast which is to be reworked or reshaped; for example, where undue pressure is produced by the cast at any one particular point, it merely becomes necessary to heat the cast at such point and remove the portion which has thus been rendered plastic and replace the same, making allowance for the undue pressure previously produced. Upon cooling, the portion so removed and replaced will become an integral part of the cast.

Further, it is to be noted that breaking or crushing of the composition previous to its use does not in any way impair its efficiency or workability, since it merely requires the application of the necessary heat to render the composition as a whole plastic, whereupon the fragments will become fused and become an integral part of the entire composition.

Having thus described my said invention, what I claim and desire to secure by Letters Patent is:—

1. A plastic composition comprising calcium sulfate, and a binder composed of a drying oil, resin and wax, substantially as specified.

2. A plastic composition comprising plaster of Paris, boiled linseed oil, resin and wax, substantially as specified.

3. A plastic composition comprising plaster of Paris, boiled linseed oil, resin and carnauba wax, substantially as specified.

4. A plastic composition comprising plaster of Paris forty-one (41) parts, boiled linseed oil two (2) parts, resin eleven (11) parts, and wax three (3) parts, substantially as specified.

5. A plastic composition comprising plaster of Paris forty-one (41) parts, boiled linseed oil two (2) parts, resin eleven (11) parts, and carnauba wax three (3) parts, substantially as specified.

Signed at the city of New York, in the county and State of New York, this nineteenth day of January, one thousand nine hundred and eighteen.

JANE SANDERSON.

Witnesses:
FRANK W. BURR,
CONRAD A. DIETERICH.